(12) United States Patent
Koshy

(10) Patent No.: US 6,782,406 B2
(45) Date of Patent: Aug. 24, 2004

(54) FAST CMOS ADDER WITH NULL-CARRY LOOK-AHEAD

(75) Inventor: Kamal J. Koshy, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 572 days.

(21) Appl. No.: 09/877,805

(22) Filed: Jun. 7, 2001

(65) Prior Publication Data

US 2002/0188642 A1 Dec. 12, 2002

(51) Int. Cl.$^7$ ............................................. G06F 7/50
(52) U.S. Cl. ...................... 708/710; 708/713; 708/714
(58) Field of Search ................................ 708/710–714

(56) References Cited

U.S. PATENT DOCUMENTS

| | | | |
|---|---|---|---|
| 4,623,981 A | * 11/1986 | Wolrich et al. | 708/710 |
| 5,631,860 A | * 5/1997 | Morinaka | 708/710 |
| 5,633,820 A | * 5/1997 | Beakes et al. | 708/710 |
| 5,847,984 A | * 12/1998 | Mahurin | 708/710 |
| 5,898,596 A | * 4/1999 | Ruetz | 708/710 |

OTHER PUBLICATIONS

Fu–Chiang Cheng et al.: "Delay–Insensitive Carry–Lookahead Adders" VLSI Design, 1997. Proceedings., Tenth International Conference on Hydrabad, India Jan. 4–7, 1997, Los Alamitos, CA, USA, IEEE Comput. Soc, US, (1997–91–04), pp. 322–328, XP010211531 ISBN: 0–8186–7755–4. Abstract; Figures 2, 3, 6, 7, p. 323, Paragraph 2, p. 323, Paragraph 3.

* cited by examiner

*Primary Examiner*—Tan V. Mai
(74) *Attorney, Agent, or Firm*—Aaron Waxler

(57) ABSTRACT

A null-carry-lookahead adder is configured to generate and propagate a null-carry signal within and through blocks and groups of blocks within the adder. The null-carry signal terminates the effects of a carry input signal beyond the point at which the null-carry signal is generated. By forming rules for generating and propagating null-carry signals through blocks and groups of blocks within the adder, a maximum P-channel stack depth of two can be achieved for a four-bit adder block, thereby substantially improving the speed of the null-carry-lookahead adder, compared to a convention carry-lookahead adder that is based on generating and propagating carry signals within the adder.

15 Claims, 11 Drawing Sheets

FAST CMOS ADDER WITH NULL-CARRY LOOK-AHEAD

BACKGROUND OF THE INVENTION

1. Field of the Invention

This invention relates to the field of electronic circuit design, and in particular to the design of a CMOS adder circuit.

2. Description of Related Art

In a conventional ripple-adder, each adder stage propagates a carry to the next stage, thereby propagating a carry from a first stage to the last stage in a serial, and therefore slow, fashion. Because a carry from a first input stage could affect the final state of the most significant bit of the sum output, the sum output is not considered valid until sufficient time is allowed for the possible serial propagation of a carry from the first adder stage.

Carry-lookahead-generation schemes are common in the industry for the design of adder circuits that avoid the need to wait for a carry at the first stage to serially propagate to the most significant bit of the sum output. The adder is partitioned into functional blocks that each receive a pair of sets of input bit-values and a carry-input bit value. The input bit-values to each block determine whether a carry-output is generated within the block from the input bit-values, and/or whether the block is 'sensitized' to propagate the carry-input value to the carry-output value. Consider, for example, a single-bit adder block with inputs a, b, and carry-in. If a and b are both a logic 1, a carry-out is generated (independent of the value of carry-in). Likewise, if either a or b is a logic 1, the value of the carry-in, c, is propagated to the carry-out (if the carry-in is a logic 1, the carry-out will be logic 1). If, on the other hand, both a and b are at logic 0, a carry-out is not generated, and a carry-in is not propagated (carry-out will be logic 0, independent of the value of carry-in)

FIG. 1 illustrates an example block diagram of the carry generation and propagation logic portion of a conventional carry-lookahead adder. In the example of FIG. 1, the adder is partitioned into four-bit functional blocks. A four-bit carry generate/propagate block 110a receives a pair of the lower-order four-bits of two input arguments, A[3:0], B[3:0], and, based on these inputs, determines whether a carry-output (C3) is generated, gC3-0, by the lower-order (3:0) input-bits. This block also determines whether the carry-input (Cin) is propagated, pC3-0, to the carry-output (C3). Similar four-bit generate/propagate blocks 110b–d are configured to determine whether a carry-out is generated, gC7-4, gC11-8, etc., by the corresponding set of inputs {A[7:4], B[7:4]}, {A[11:8], B[11:8]}, etc., and whether each corresponding carry-in is propagated, pC7-4, pC11-8, etc.

The generate-carry and propagate-carry signals from each block are combined, in group carry generate/propagate blocks 120a–b, to determine whether a carry-out signal from each group is generated, gC7-0, gC15-8, from within the group, {[7:4]–[3:0]}, {[15:12]–[11:8]}, and whether the carry-in signal (Cin, C7) to each group is propagated, pC7-0, pC15-8, through the group. In like manner, the group generate and propagate signals are used, in the group generate/propagate block 130, to generate a higher-level group generate gC15-0 and propagate pC15-0 signals. FIG. 2 illustrates the generation of group-generate and group-propagate signals from the generate-Carry and propagate-Carry signals from a pair of stages (upper-order-stage and lower-order-stage) that form the group. A carry-out signal is generated within the group if the carry is generated within the upper stage, or, if the carry is generated within the lower stage, and the upper stage is sensitized to propagate the carry that is generated within the lower stage. The group is sensitized to propagate the carry-in signal that is received by the group if both the lower-stage and the upper-stage are sensitized to propagate the carry input to each of the stages.

Note that, with these group generate signals being provided, the higher order carry signals can be easily generated, based only on the value of in the carry-in signal, if any, to the adder, and the values of the generate-carry and propagate-carry signals. For example, if gC15-0 (generate carry within the group of bits 0 through 15) is logic 1, then the carry-output C15 of the group [15:0] will be logic 1; or, if pC15-0 (propagate carry-in through the bit 0–15 stages) is logic 1, and the carry-in Cin is logic 1, then the carry-output C15 will be logic 1; otherwise, unless the generate-carry gC15-0 signal a logic 1, C15 is logic 0. This optimization can be extended to higher order sets of bits [31:0], [63:0], and so on. In like manner, intermediate carry-out values, C11, C19, and so on, can be easily generated as illustrated in FIG. 3.

A pair of sum-output values is determined based on the inputs to each block in the adder, as illustrated in FIG. 4. A conditional sum determinator 210 determines a first sum S|C=0 as the sum of the inputs A, B to the block, if the carry-in to the block is logic 0, and a second sum, S|C=1 as the sum of the inputs to the block if the carry-in to the block is logic 1. That is, each sum is determined, independent of the actual carry-in to each block. When the carry-in to each block is determined, via the example circuit of FIG. 3, the corresponding sum S|C=0 or S|C=1 is selected, via the selector 220 associated with each block.

The speed of a carry-lookahead adder is generally bound by the speed of the carry-generation and propagation process. FIG. 5A illustrates an example logic diagram for a four bit generate/propagate block, such as might be used for each of the blocks 110a–d of FIG. 1, and FIG. 5B illustrates an example equivalent logic diagram for a four bit generate/propagate block 110' that is optimized for speed, using DeMorgan's laws of equivalence. The block 110' of FIG. 5B is formulated from the logic of block 110 of FIG. 5A into sets of AND-AND-NOR gates 310-320-330, and sets of OR-OR-NAND gates 340-350-360, using DeMorgan's laws of inverse functions.

As is known in the art, AND-AND-NOR gates and OR-OR-NAND gates can each be formulated as a single-stage complex gate, as illustrated by the CMOS complex gates of FIGS. 6 and 7, respectively. As illustrated in FIG. 6, if inputs A, B, AND C are logic 1, OR, inputs D AND E are logic 1, the output F will be a logic 0; otherwise, the output F will be a logic 1. As illustrated in FIG. 7, if either A, B, OR C are logic 1, AND, either D OR E are logic 1, the output F will be a logic 0; otherwise, the output F will be a logic 1. The use of a complex, or matrix, gate to effect the AND-AND-NOR (or OR-OR-NAND) function avoids the sequential delay of first determining the results of the AND (or OR) functions and then determining the results of the NOR (or NAND) function.

The speed of a complex gate is generally determined based on the time required to discharge or charge the output node F to ground or power potentials, respectively. The discharge time is determined by the longest serial path to ground through the N-channel devices of the matrix gate, and the charge time is determined by the longest serial path to power potential through the P-channel devices.

As is known in the art, a P-channel device is inherently slower than an equal sized N-channel device. As also known in the art, an increase in the gate size of a device increases the capacitive load on the device that is driving the gate, thereby increasing the power consumption and further decreasing the speed of the device unless the device that is driving the gate is also increased in size. Therefore, for the same area and power constraints, a series of N-channel devices will be faster than an equivalent series of P-channel devices. Or, alternatively stated: for the same speed constraints, a series of N-channel devices will be smaller and consume less power than an equivalent series of P-channel devices.

In FIG. 7, the series connection of the P-channel gates that are gated by signals A, B, and C form the longest series path, with a series length, or "stack depth" of three P-channel devices for bringing the state of node F to the power potential. The N-channel stack depth, or maximum series length, for discharging the node F to ground potential is two N-channel devices, one of the three N-channel devices that are gated by signals A, B, and C, and one of the two N-channel devices that are gated by signals D and E. Therefore, the maximum delay of the matrix OR-OR-NAND structure of FIG. 7 is the sum of the delay through the three series P-channel devices.

In FIG. 6, on the other hand, the series connection of the N-channel gates that are gated by signals A, B, and C form the longest series path, of three N-channel devices, for discharging the state of node F, and the longest series path for charging node F is two P-channel devices. Therefore, the maximum delay time for forming an output at the node F is determined as the maximum delay of three N-channel devices, or two P-channel devices. With the inherent slower speed of P-channel devices compared to N-channel devices, these N and P series delays may be similar, but in either event, the delay of the AND-AND-NOR structure of FIG. 6 is less than the delay of the OR-OR-NAND structure of FIG. 7, for similar area constraints.

As demonstrated by the example structures of FIGS. 6 and 7, in a series of devices that form a critical path, an embodiment that reduces the P-channel stack depth, even at the cost of a corresponding increase in the N-channel stack depth, will be more efficient in terms of power, speed, and/or area than an equal-length series of devices with a larger P-channel stack depth.

In the example of FIG. 5B, the critical path for forming the generate-carry signal includes the AND-AND-NOR gate 310-320-330 and the OR-OR-NAND gate 340-350-360, and this path can be shown to be the longest delay path through the generate/integrate block 130 of FIG. 1, because of the three P-channel devices in series in the OR-OR-NAND gate 340-350-360.

BRIEF SUMMARY OF THE INVENTION

It is an object of this invention to improve the speed of a carry-lookahead adder. It is a further object of this invention to reduce the P-channel stack depth within critical paths of a carry-lookahead adder.

These objects and others are achieved by providing a carry-lookahead adder that is configured to generate and propagate a null-carry signal within and through blocks and groups of blocks within the adder. A null-carry signal is a signal that terminates the effects of a carry input to the block or group of blocks beyond the point at which the null-carry signal is generated. By forming rules for generating and propagating null-carry signals through blocks and groups of blocks within the adder, a maximum P-channel stack depth of two can be achieved for a four-bit adder block, thereby substantially improving the speed of the carry-lookahead adder, compared to a convention carry-lookahead adder that is based on generating and propagating carry signals within the adder.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
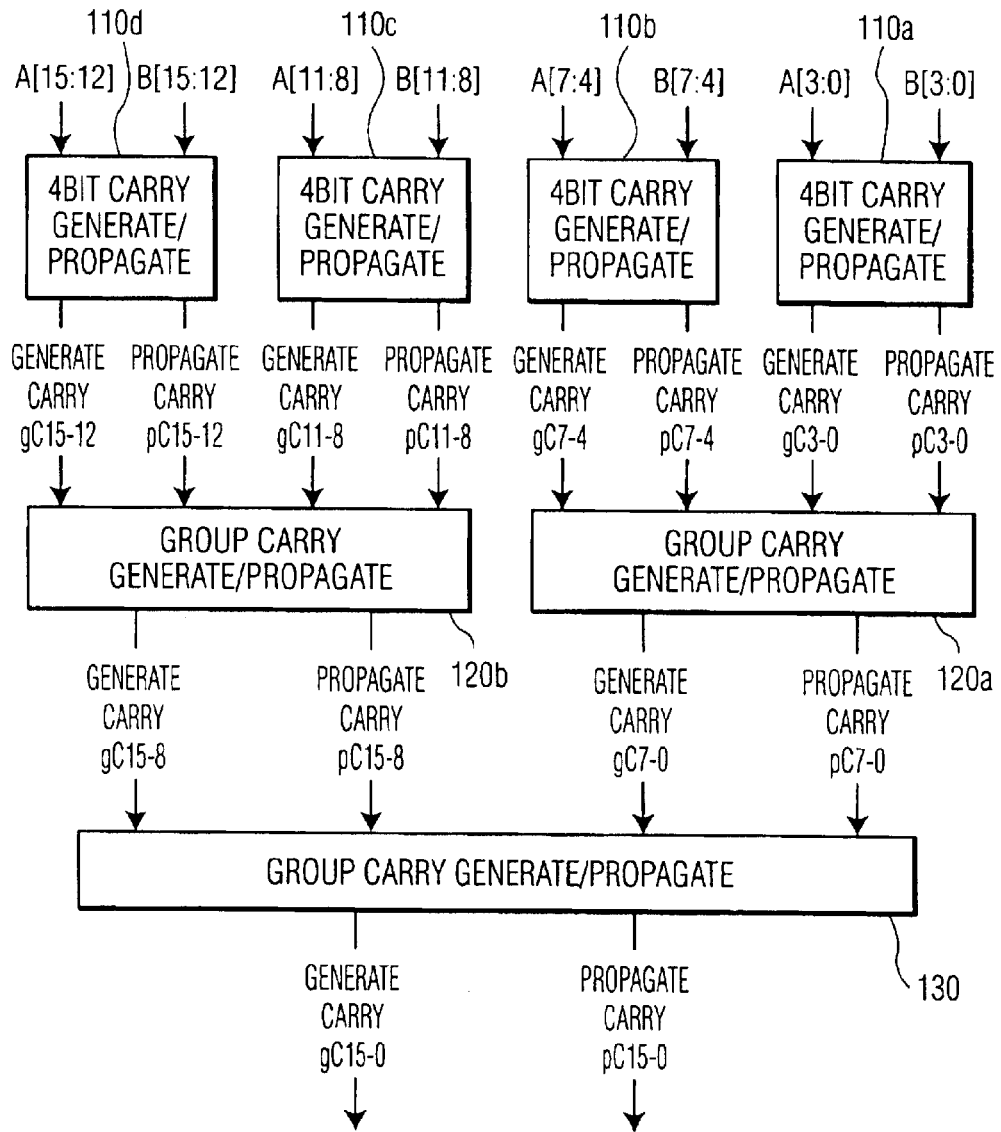
FIG. 1 illustrates an example block diagram of the carry generation and propagation logic portion of a conventional carry-lookahead adder.
Figure 2:
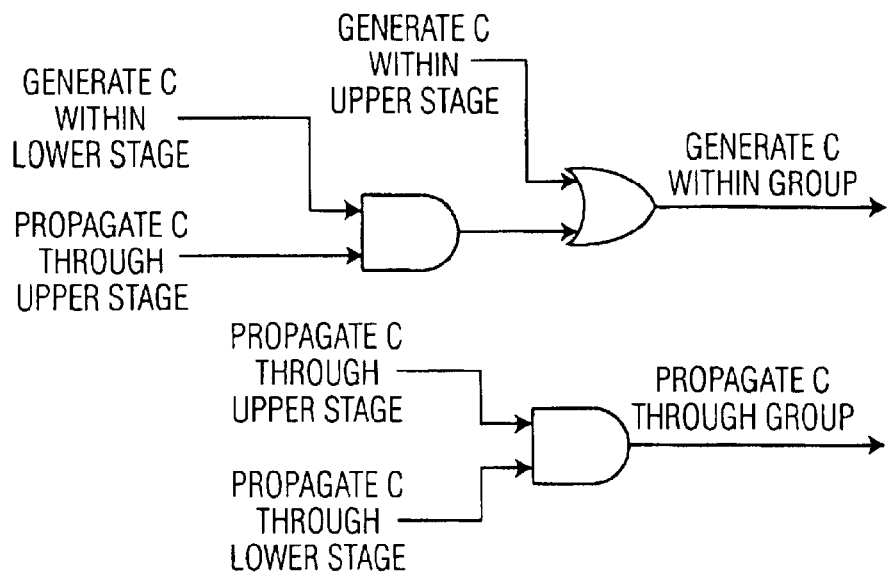
FIG. 2 illustrates the generation of group-generate and group-propagate signals in a conventional carry-lookahead adder.
Figure 3:
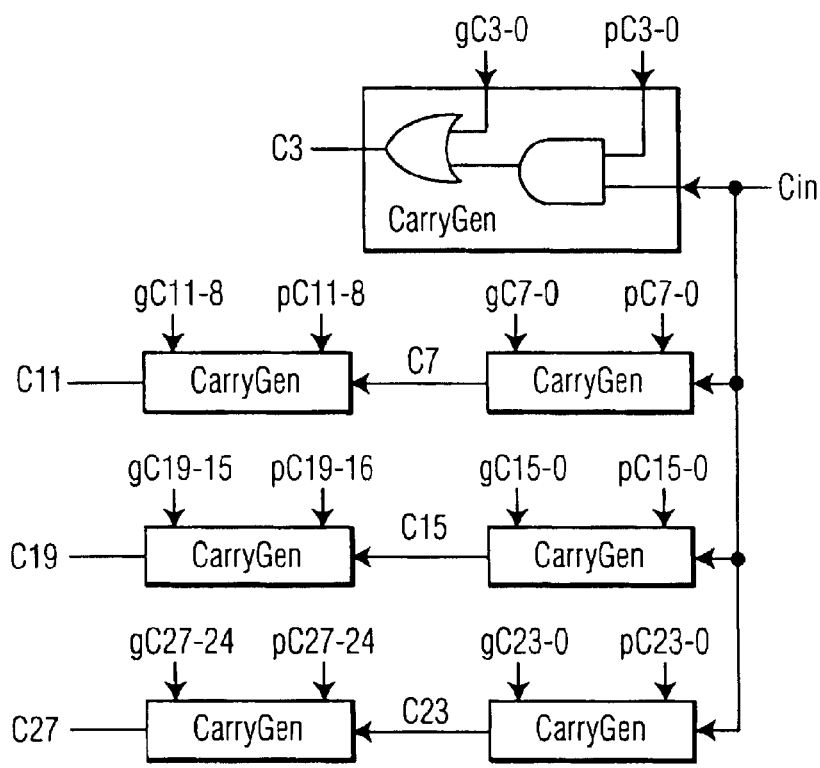
FIG. 3 illustrates an example block diagram for determining block carry signals in a conventional carry-lookahead adder.
Figure 4:
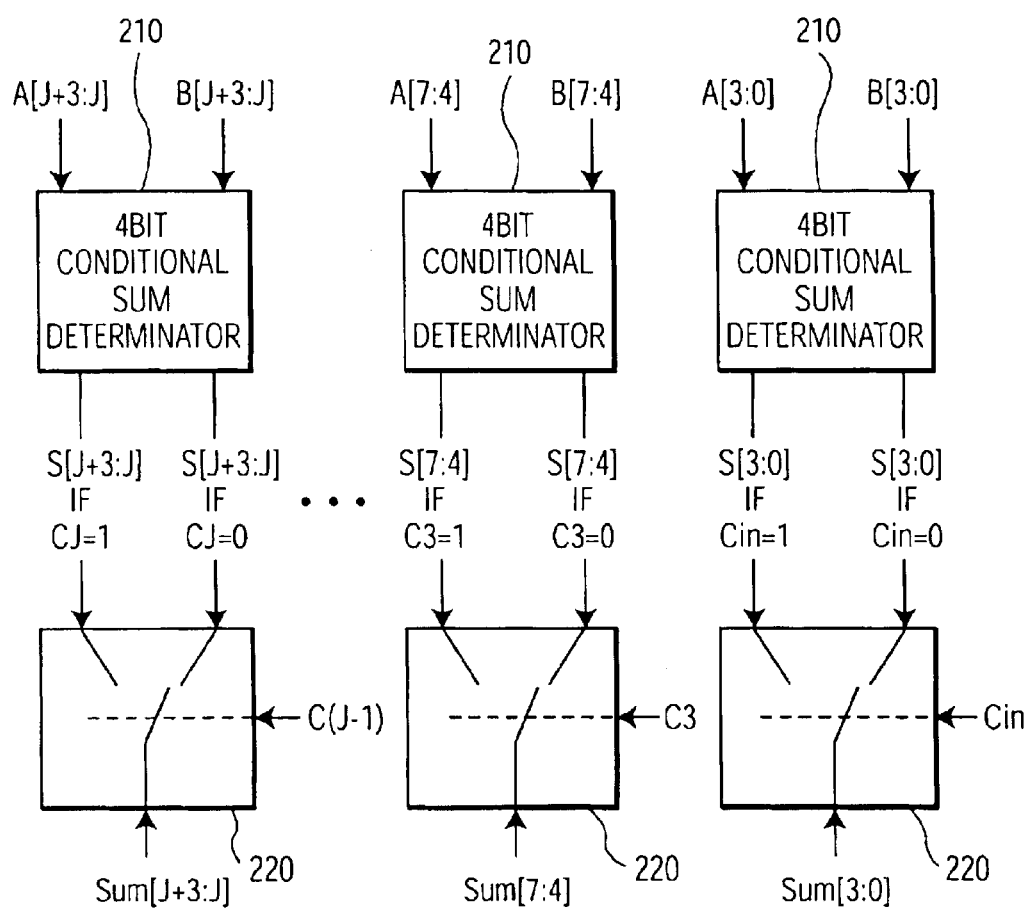
FIG. 4 illustrates an example block diagram for determining sum signals in a conventional carry-lookahead adder.
Figure 5A:
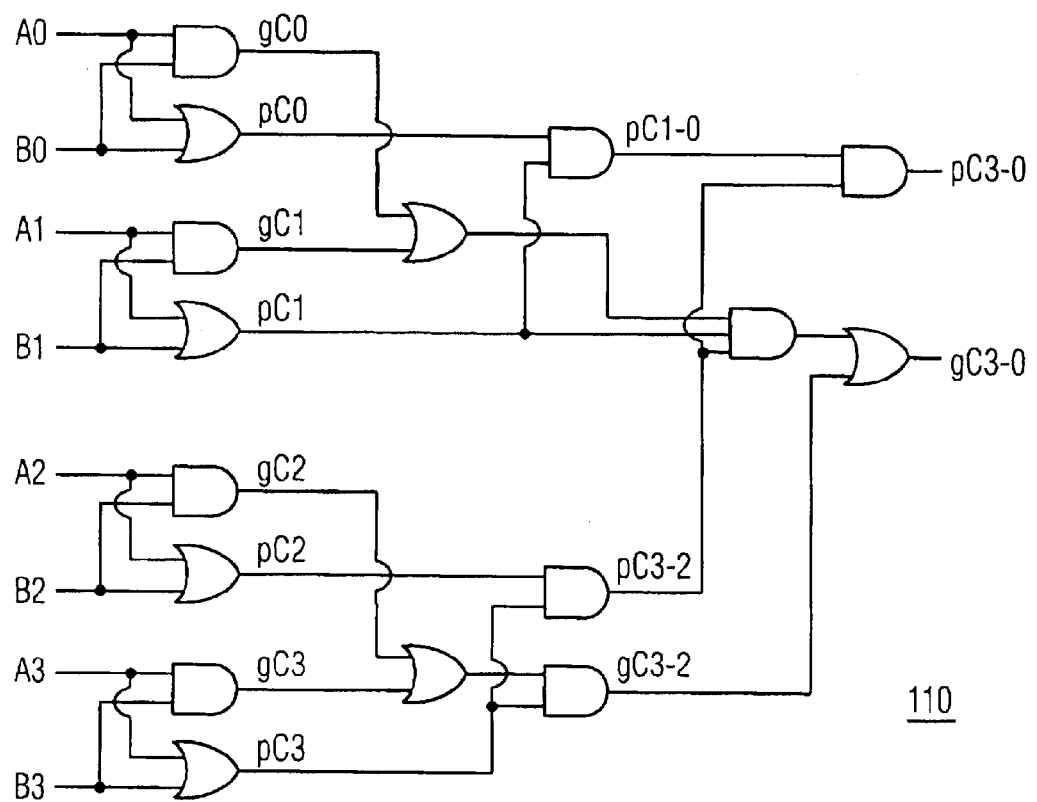
FIGS. 5A and 5B illustrate example equivalent logic circuits for determining generate-carry and propagate-carry signals for a four-bit adder block of a conventional carry-lookahead adder.
Figure 8:
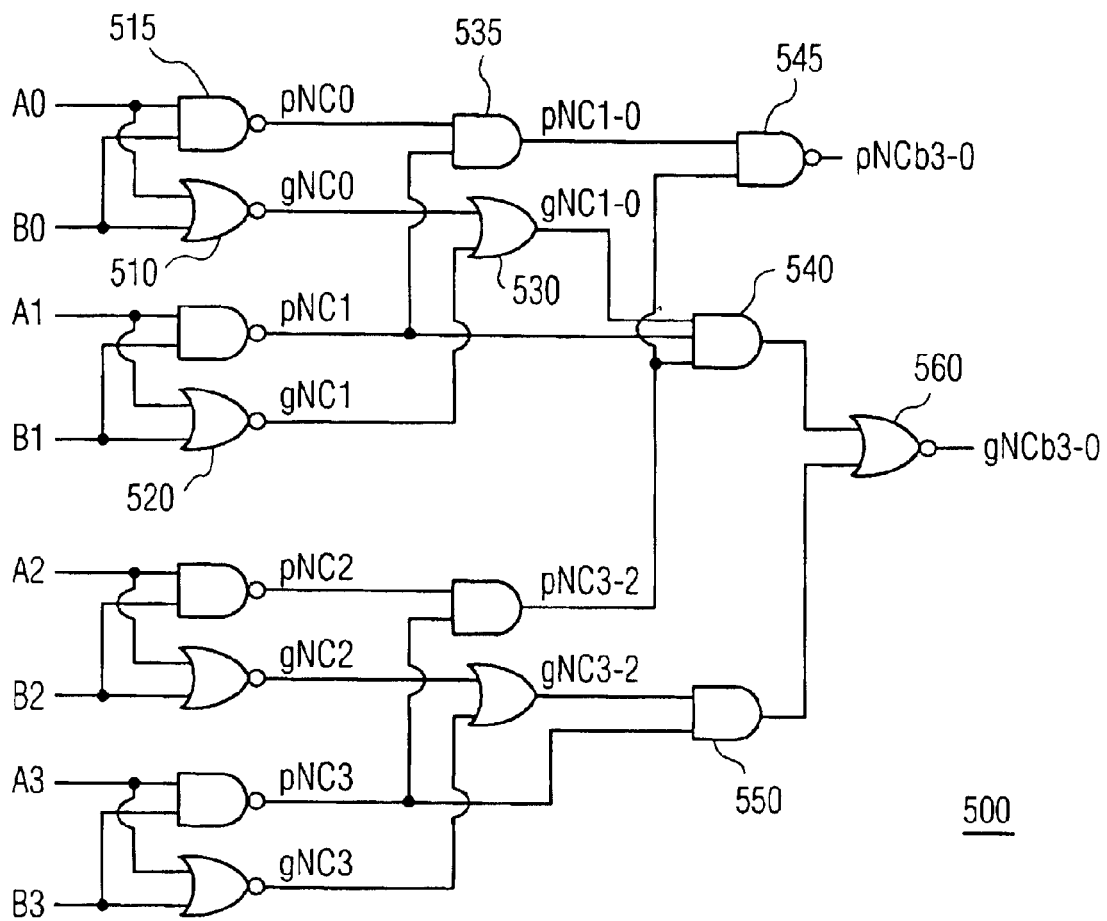
FIG. 8 illustrates an example logic circuit for determining generate-null-carry and propagate-null-carry signals for a four-bit adder block of a null-carry-lookahead adder in accordance with this invention.

FIG. 8 illustrates an example logic circuit 500 for determining generate-null-carry and propagate-null-carry signals for a four-bit adder block of a null-carry-lookahead adder in accordance with this invention. A null-carry signal is a signal that terminates the effects of a carry beyond the point at which the null-carry signal is generated. Consider, for example, the generation of a null-carry in the bit-0 stage of the adder. If both the A0 and B0 input signals are logic-0, a carry signal cannot be generated, regardless of the value of a carry-in signal. As illustrated, the generate null-carry signal, gNC0, is embodied as a NOR function 510 of the inputs A0 and B0; that is, generate null-carry is asserted if and only if both A0 and B0 are logic-0. Note that this generate-null-carry signal gNC0 is not merely the inverse of the generate carry signal gC0 of FIGS. 5A, 5B. In the conventional carry-lookahead adder, the generate carry signal gC0 is produced if and only if both A0 and B0 are logic-1. If only one of the A0 or B0 signals are at a logic-1, both the gC0 signal of FIGS. 5A, 5B and the gNC0 signal of FIG. 8 will be logic-0, because neither a carry nor a null-carry is generated within the cell, independent of the carry-in signal. That is, in the conventional carry-lookahead adder, the term "generate carry" is shorthand for "generate carry without regard to carry-in", and in this invention, the term "generate null-carry" is shorthand for "generate null-carry without regard to carry-in", and these terms are not complements of each other. As such, the circuit of FIG. 8 is not a DeMorgan equivalent of the circuit of FIGS. 5A, 5B.

In like manner, a null-carry signal will be propagated, without regard to the value of the null-carry-in signal, from the input to the output of the bit-0 stage, if and only if at least one of the inputs A0, B0 is logic-0, as indicated by the NAND gate 515 that provides the pNC0 (propagate null-carry through 0 bit stage) signal. That is, if a null-carry is asserted at the input of the bit-0 stage, and at least one of the inputs A0, B0 is logic-0, an asserted null-carry is propagated to the output of the bit-0 stage; if a null-carry is not asserted at the input to the bit-0 stage, and at least one of the inputs A0, B0 is logic-0, a null-carry is not asserted at the output of the bit-0 stage. Note that this signal pNC0 is not the complement of the propagate carry signal pC0 of FIGS. 5A, 5B, further demonstrating that the circuit of FIGS. 5A, 5B and the circuit of FIG. 8 are not logical equivalents of each other.

The null-carry signal is generated within the group of bit 0 and bit 1 if either bit generates the null-carry signal, as indicated by the OR gate 530. That is, if either stage terminates the effect of a carry input signal, the effect is terminated relative to the group. This generated null-carry signal will generate a null-carry signal within the group of bit 0 through bit 3, if the null-carry signal is propagated through the bit-1 stage, and is propagated through the bits 2–3 stage, as indicated by the three-input AND gate 540. Additionally, a null-carry signal is generated within the group of bit 0 through bit 3, if the null-carry signal is generated in the upper 2–3 bit stages, and the null-carry signal is propagated through the uppermost stage, as indicated by the AND gate 550. The NOR gate 560 combines the outputs of the gates 540, 550 to provide the inverse gNCb3-0 of the generate null-carry signal for the bits 0-to-3 stage.

Figure 5B:
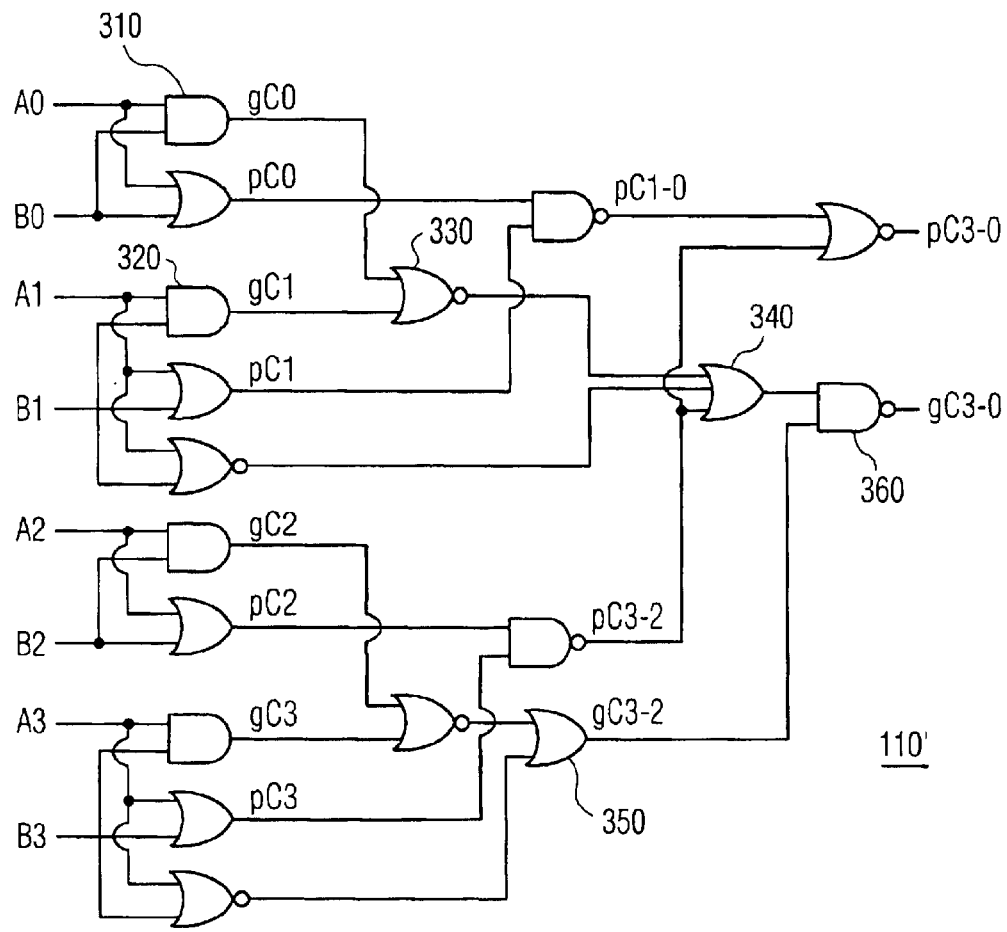
Figure 6:
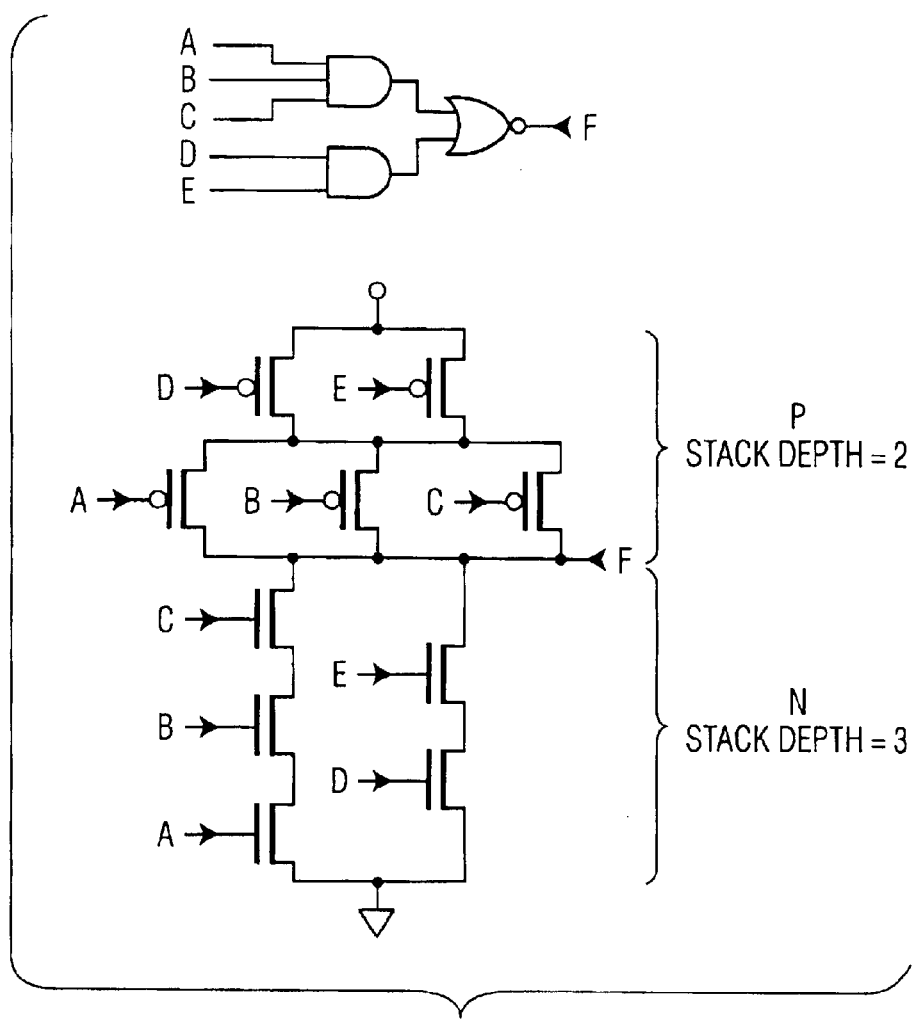
FIG. 6 illustrates a conventional CMOS matrix gate corresponding to an AND-AND-NOR logic structure.
Figure 7:
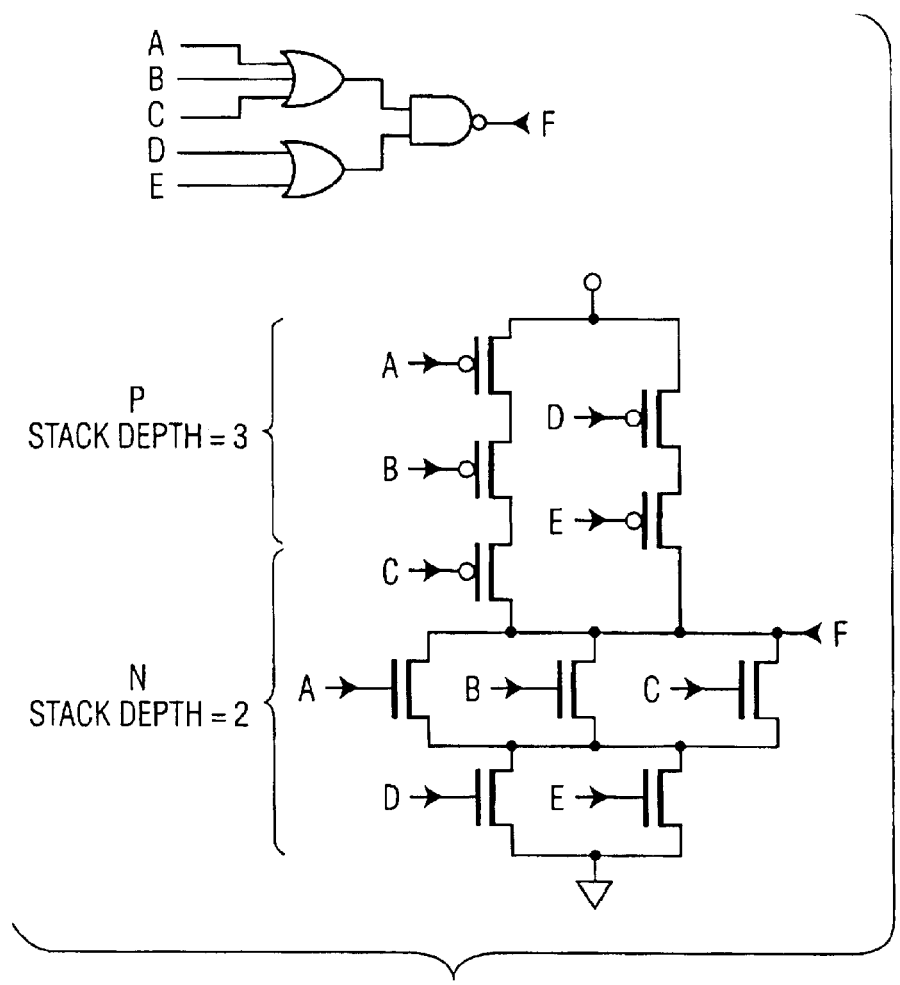
FIG. 7 illustrates a conventional CMOS matrix gate corresponding to an OR-OR-NAND logic structure.

Note that, in FIG. 8, the gates 540, 550, 560 form an AND-AND-NOR function, which, as illustrated in FIG. 6, can be implemented as a matrix gate with a p-channel stack depth of 2, and an n-channel stack depth of 3. The gates 510, 520, 530 form a NOR-NOR-OR function, which is equivalent, via DeMorgan's laws, to an OR-OR-NAND function, such as illustrated in FIG. 7. Because each of the gates 510, 520 have only two inputs, the devices controlled by the third input signal C in FIG. 7 are eliminated, thereby reducing the p-channel stack depth to 2. As compared to the conventional generate-carry logic, the maximum p-channel stack depth in the generate-null-carry logic of FIG. 8 is two, whereas the maximum p-channel stack depth in the conventional generate-carry logic of FIG. 5B is three. As such, the generate-null-carry logic of FIG. 8 will generate each 4-bit adder stage's generate-null-carry signal (in inverse form) in less time than the conventional logic of FIG. 5b can generate each 4-bit adder stage's generate-carry signal, assuming equal sized devices between FIG. 8 and FIG. 5B.

Figure 9:
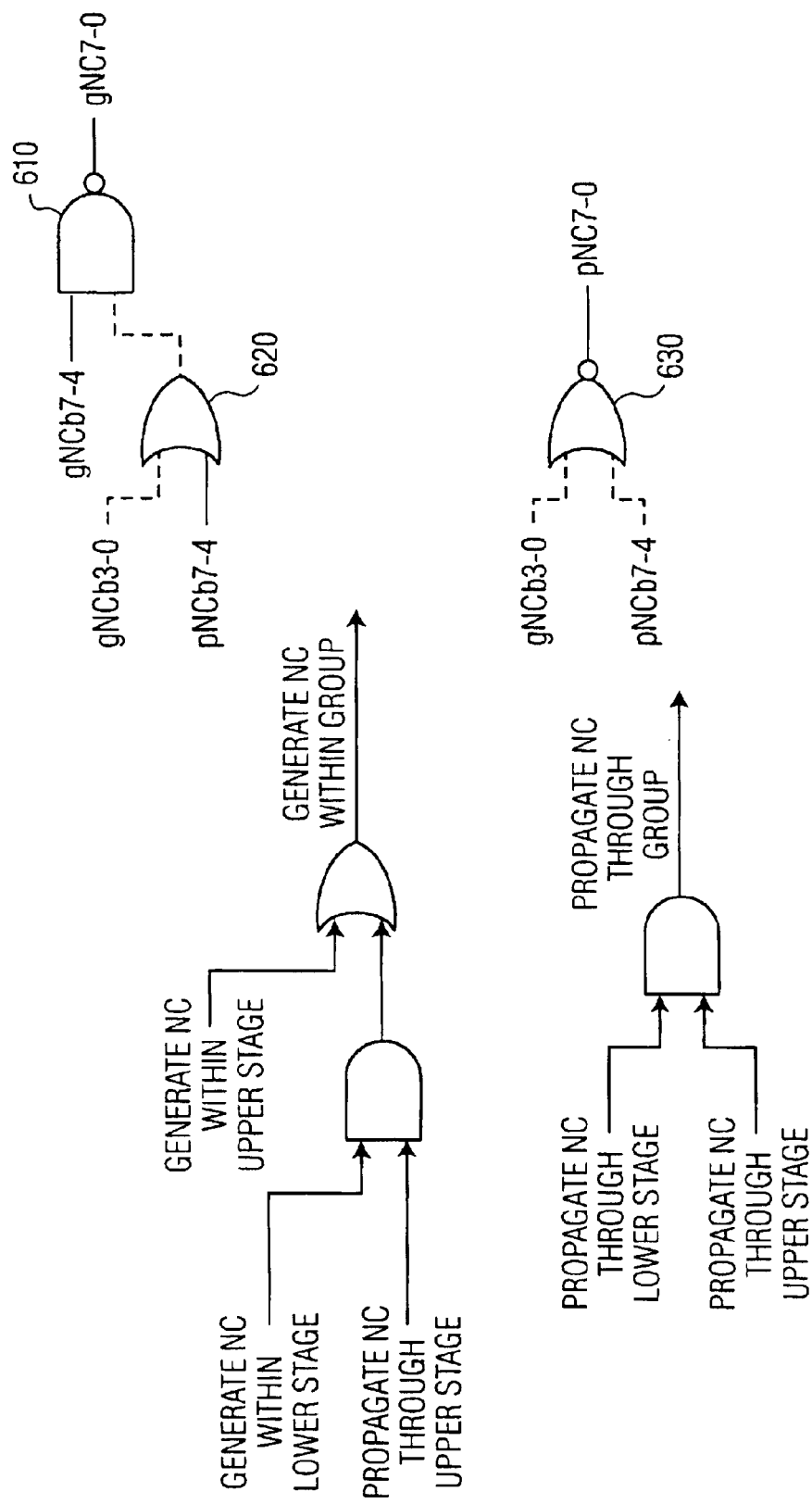
FIG. 9 illustrates the generation of group-generate and group-propagate signals in a null-carry-lookahead adder in accordance with this invention.

FIG. 9 illustrates the generation of group-generate and group-propagate signals in a null-carry-lookahead adder in accordance with this invention. In this context, a group comprises an upper and lower stage, such as a bits 0-to-3 stage and a bits 4-to-7 stage that form a bits 0-to-7 group. As illustrated, the generate null-carry signal for the group is asserted if either the generate null-carry signal of the upper stage is asserted, or if the generate null-carry signal of the lower stage is asserted and the propagate null-carry signal of the upper stage is asserted. Gates 610, 620 illustrate an example embodiment for providing the generate null-carry signal gNC7-0, based on the inverse gNCb3-0 and gNCb7-4 of the generate null-carry, as generated by the aforementioned NOR gate 560 of FIG. 8 in each four-bit stage. A single matrix gate, such as illustrated in FIG. 7, but without the devices gated by signals B and C, can be used to provide the gates 610–620 with a single stage delay corresponding to a p-channel stack depth of two.

In like manner, returning to FIG. 8, the null-carry signal is propagated through the bits 0–1 stage, pNC1-0, if the null-carry signal is propagated through the bit 0 stage, pNC0, and through the bit 1 stage, pNC1, via the AND gate 535. The NAND gate 545 provides the inverse pNCb3-0 of the propagate null-carry for the bits 0-to-3 stage, based on the propagate null-carry signals pNC1-0 and pNC3-2. As illustrated in FIG. 9, the group propagate null-carry signal is asserted if both propagate null-carry signals, from the upper and lower stages, are asserted. The NOR gate 630 illustrates an example embodiment for providing the propagate null-carry signal gNC7-0, based on the inverse pNCb3-0 and pNCb7-4 signals, as generated by the NAND gate 545 of FIG. 8 in each four-bit stage.

Figure 10:
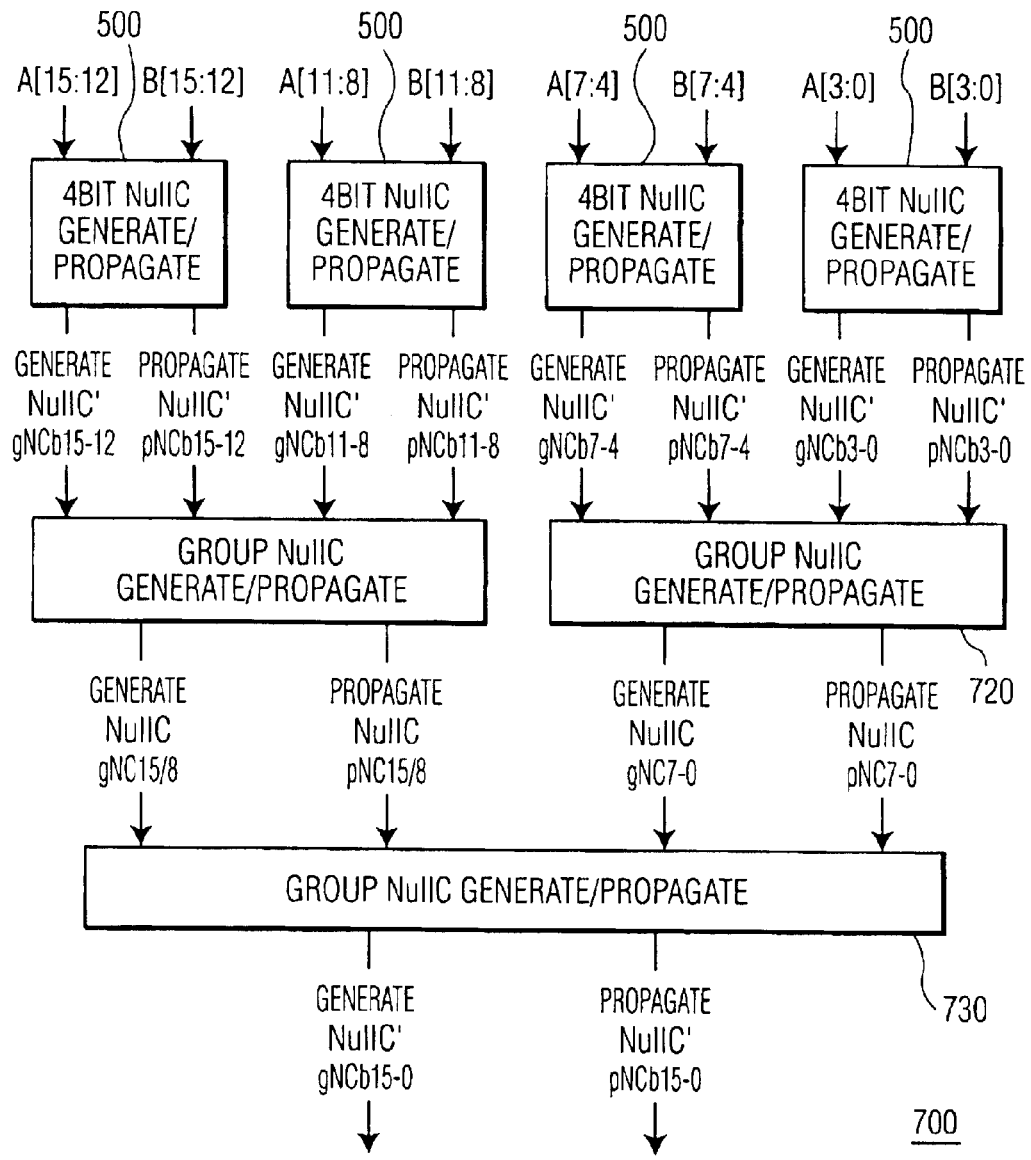
FIG. 10 illustrates an example block diagram of a null-carry generation and propagation logic portion of a null-carry-lookahead adder in accordance with this invention.

FIG. 10 illustrates an example block diagram of a null-carry generation and propagation logic portion 700 of a null-carry-lookahead adder in accordance with this invention. The 4-bit null-carry generate/propagate blocks 500 provide the inverse generate and propagate null-carry signals (gNCbx-y, pNCbx-y) for each set of four bits; additional 4-bit blocks can be provided for additional bit widths. The group null-carry generate/propagate blocks 720 receive the inverse signals from pairs of blocks 500 and provide the generate and propagate null-carry signals for each group, using the logic illustrated in FIG. 9. In like manner, the group null-carry generate/propagate block 730 receives the group generate and propagate signals from the blocks 720 and generates inverse group generate and propagate signals gNCb15-0, pNCb15-0 using an AND-NOR configuration corresponding to the logic illustrated in FIG. 9. Higher level group generate and propagate null-carry signals are similarly provided by the subsequent grouping of each lower-level pair, in a hierarchical fashion.

Figure 11A:
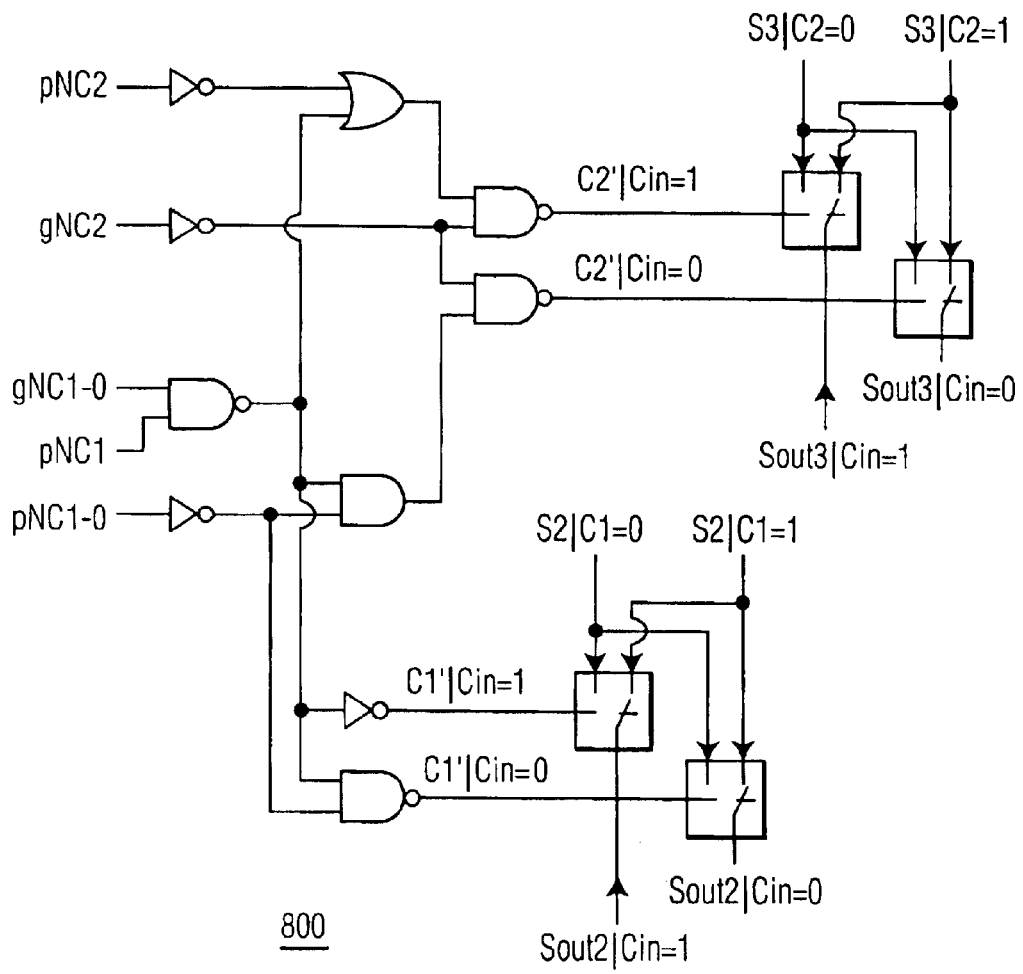
FIG. 11 illustrates an example logic diagram for producing conditional sum signals based on the generate and propagate null-carry signals in accordance with this invention.
Figure 11B:
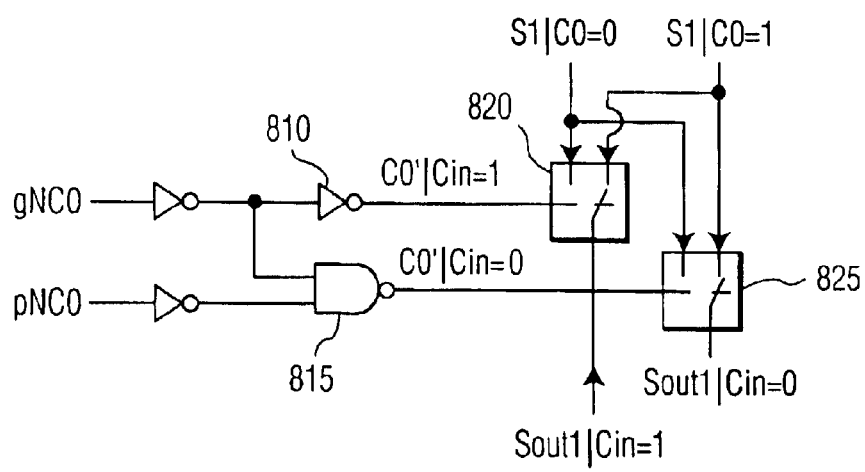

For completeness, FIG. 11 illustrates an embodiment of a logic block 800 for determining the conditional sum output signals in each four bit stage, based on the generate and propagate null-carry signals that are provided in accordance with this invention. As is common in the art, alternative equivalent logic embodiments may be employed. In this preferred embodiment, the generate null-carry and propagate null-carry signals are reused, and the loading on the primary inputs (A, B) is reduced.

The conditional sum signals Sout0 for the bit-0 stage are:

$$Sout0|(Cin=0) = \overline{A0*B0+gNC0};$$

$$Sout0|(Cin=1) = \overline{(A0+B0)*pNC0};$$

Similarly, the conditional sum signals S1 for the bit-1 stage, based on the Carry-out signal Cout0 from the bit-0 stage are:

$$S1|(Cout0=0) = \overline{A1*B1+gNC1};$$

$$S1|(Cout0=1) = \overline{(A1+B1)*pNC1};$$

The Carry-out signal C0 from the bit-0 stage can be expressed as:

$$C0|(Cin=0) = \overline{gNC0 + pNC0} = \overline{gNC0} * \overline{pNC0}; \text{ and,}$$

$$C0|(Cin=1) = \overline{gNC0};$$

as illustrated by the gates 810, 815 in FIG. 11

With regard to the Cin signal to the block, therefore, the conditional sum signals for the bit-1 stage are:

$$Sout1|(Cin=0) = (S1|Cout0=0)*( \\ \overline{Cout0}|Cin=0) + (S1|Cout0=1)*(Cout0|Cin=0)$$

$$Sout1|(Cin=1) = (S1|Cout0=0)*( \\ \overline{Cout0}|Cin=1) + (S1|Cout0=1)*(Cout0|Cin=1)$$

Because the second component ($\overline{Cout0}$|Cin=x) of the first term in each of these equations is equal to the inverse of the second component (Cout0|Cin=x) of the second term, each of these equations are preferably implemented as a multiplexer that selects the first component of either the first or second term, depending upon the state of second component, as illustrated by the multiplexers 820, 825 in FIG. 11.

In like manner, the conditional sum signal of bits 2 and 3 (Sout2|Cin=x, and Sout3|Cin=x) are determined by determining the conditional sum based on the carry outputs of the prior bits 1 and 2, respectively (S2|C1=x, and S3|C2=x), and the conditional carry outputs based on the carry signal (C1|Cin=x, and C2|Cin=x), and selecting the appropriate conditional sum as the output sum signal, based on the conditional carry output, as illustrated in FIG. 11. Note that in the example embodiment of FIG. 11, these conditional sums are each generated from the generate and propagate null-carry signals, and do not add load to the primary A, B inputs.

The carry-input signal to each stage determines the selection of the appropriate set of four conditional sum bits. The above discussed generation and propagation null-carry logic of FIG. 8 determines the carry-input signal for each stage. For example:

$$C7 = Cin * \overline{(pNC7\text{-}0) + (gNC7\text{-}0)}.$$

That is, the carry output of the 7$^{th}$ bit will be logic-0 if either: the first stage carry input is 0 and null-carry is propagated through the 0$^{th}$ to the 7$^{th}$ bit group; or, a null-carry is generated from the 0$^{th}$ to 7$^{th}$ bit group.

Note that the propagate-null-carry signal only has an effect on the carry output signal if the first stage carry input is 0. Thus, the first stage carry input signal may be embedded within the propagate complement-carry signal, as in:

$$pNC15\text{-}0 = (pNC15\text{-}8)*(pNC7\text{-}0)*\overline{Cin}.$$

Using this convention, the following intermediate carry signals can be found as:

$$C15 = \overline{(pNC15\text{-}0) + (gNC15\text{-}0)};$$

$$C23 = \overline{(pNC23\text{-}16)} * \overline{(pNC15\text{-}0)} + \overline{(gNC23\text{-}16)} + \overline{((gNC15\text{-}0)} * \overline{(pNC23\text{-}16))}; \text{ and}$$

$$C31 = \overline{(gNC31\text{-}16)} * \overline{((pNC31\text{-}16)} + \overline{(pNC15\text{-}0)} * \overline{(gNC15\text{-}0))}.$$

Note that the C31 signal, or its inverse, can be generated with a p-channel stack depth of two, using the generate and propagate null-carry signals in accordance with this invention, whereas the C31 signal in a conventional carry-lookahead adder has a p-channel stack depth of three, using the conventional generate and propagate carry signals.

The foregoing merely illustrates the principles of the invention. It will thus be appreciated that those skilled in the art will be able to devise various arrangements which, although not explicitly described or shown herein, embody the principles of the invention and are thus the spirit and scope of the following claims.

I claim:

1. An adder for adding two n-bit numbers comprising:
a plurality of processing blocks,
each processing block of the plurality of processing blocks being configured to determine a generate signal and a propagate signal, based on a subset of bits from each of the two n-bit numbers,
each generate signal corresponding to a determination that a null-carry output signal of the each processing block is asserted, and
each propagate signal corresponding to a determination that a null-carry input signal to the each processing block will be propagated to the null-carry output signal of the each processing block.

2. The adder of claim 1, wherein
the generate signal and propagate signal of at least one processing block are also based on the generate signal and the propagate signals of an other processing block.

3. The adder of claim 1, wherein
each pair of processing blocks of the plurality of processing blocks form a processing group of a plurality of processing groups,
each processing group having an associated generate signal, and
wherein
the generate signal of the processing group corresponds to an OR function of:
the generate signal of an upper processing block of the pair of processing blocks, and
the generate signal of a lower processing block of the pair of processing blocks and the propagate signal of the upper processing block.

4. The adder of claim 3, wherein
each processing group has an associated propagate signal, and wherein
the processing signal of the processing group corresponds to an AND function of:
the propagate signal of the upper processing block and
the generate signal of the lower processing block.

5. The adder of claim 1, wherein
each processing block includes a plurality of CMOS devices,
each CMOS device having a p-channel stack depth that is less than three.

6. The adder of claim 1, wherein
each processing block includes at least one three-input logic function, and
the at least one three input logic function is embodied in a CMOS device having a p-channel stack depth that is less than three.

7. The adder of claim 1, wherein
the plurality of processing blocks are configured in a pairwise hierarchy,
each level of the pairwise hierarchy comprising a plurality of processing groups,
a first level of the pairwise hierarchy comprising a first plurality of processing groups, each processing group of the first plurality of processing groups corresponding to a pair of processing blocks of the plurality of processing blocks, each other level of the pairwise hierarchy comprising an other plurality of processing groups, each processing group of the other plurality of processing groups corresponding to a pair of processing groups at a lower level of the pairwise hierarchy.

8. The adder of claim 7, wherein a third level of the pairwise hierarchy includes at least one three-input logic function for producing a carry output signal, and the at least one three input logic function is embodied in a CMOS device having a p-channel stack depth that is less than three.

9. The adder of claim 1, further including a plurality of conditional sum generators, wherein each conditional sum generator is configured to determine a pair of sum outputs corresponding to each bit of the subset of bits, a first sum output of the pair of sum outputs is a first sum signal corresponding to a carry input signal being in a first state, and a second sum output of the pair of sum outputs is a second sum signal corresponding to the carry input signal being in a second state.

10. The adder of claim 9, wherein each conditional sum generator includes:

a conditional carry generator corresponding to at least one bit of the subset of bits, which determines a pair of carry outputs corresponding to the at least one bit, a first carry output of the pair of carry outputs is a first carry signal corresponding to the to the carry input signal being in a first state, and a second carry output of the pair of carry outputs is a second carry signal corresponding to the carry input signal being in a second state, and the first and second sum outputs corresponding to the at least one bit are determined based on the first and second carry outputs.

11. The adder of claim 10, wherein each conditional sum generator is further configured to determine the first and second carry outputs based solely on select generate and propagate signals.

12. A method for determining a plurality of carry output signals, each carry output corresponding to a subset of bits of an n-bit addition, the method comprising:

determining a generate signal that corresponds to a production of a null-carry signal within the subset of bits, independent of a carry input signal, and determining a propagate signal that corresponds to a propagation of a null-carry input signal to a null-carry output, and determining the carry output based on the generate signal, the propagation signal, and the carry input signal.

13. The method of claim 12, wherein each subset of bits includes a first set of bits and a second set of bits;

determining the generate signal for the subset of bits includes:

determining a first generate signal for the first set of bits, determining a first propagate signal for the first set of bits, and determining a second generate signal for the second set of bits; and the generate signal is a combination of the first generate signal, the first propagate signal, and the second generate signal.

14. An adder for adding two n-bit numbers comprising:

a plurality of four-bit processing blocks that are each configured to accept as input four bits of each of the two n-bit numbers and to provide as output a generate-null-carry signal and a propagate-null-carry signal corresponding to the input four bits;

a first plurality of group processing blocks that are each configured to accept as input the generate-null-carry signal and the propagate-null-carry signal from each of two processing blocks of the plurality of four-bit processing blocks, and to produce therefrom a first group-generate signal and a first group-propagate signal corresponding to the two four-bit processing blocks; and a second plurality of group processing blocks that are each configured to accept as input the first group-generate signal and the first group-propagate signal from each of two group processing blocks of the first plurality of group processing blocks, and to produce therefrom a second group-generate signal and a second group-propagate signal corresponding to the two group processing blocks.

15. The adder of claim 14, wherein each four-bit processing block of the plurality of four-bit processing blocks including:

a first CMOS matrix gate that is configured to accept as input a first pair of bits of the input four bits of each of the two n-bit numbers, and to produce therefrom a first generate signal and a first propagate signal corresponding to the first pair of bits;

a second CMOS matrix gate that is configured to accept as input a second pair of bits of the input four bits of each of the two n-bit numbers, and to produce therefrom a second generate signal and a second propagate signal corresponding to the second pair of bits;

a first NAND gate that provides a third propagate signal based on a first bit of the first pair of bits of each of the two n-bit numbers, a second NAND gate that provides a fourth propagate signal based on a first bit of the second pair of bits of each of the two n-bit numbers, and a third CMOS matrix gate that is configured to accept as input the first generate signal, the second generate signal, the second propagate signal, the third propagate signal, and the fourth propagate signals, and to produce therefrom the generate-null-carry signal;

wherein each of the first, second, and third CMOS matrix gates has a p-channel stack depth that is less than three.

* * * * *